June 20, 1967  C. A. HOGG  3,326,231
FLUID REGULATING VALVE MECHANISM
Filed Nov. 19, 1964
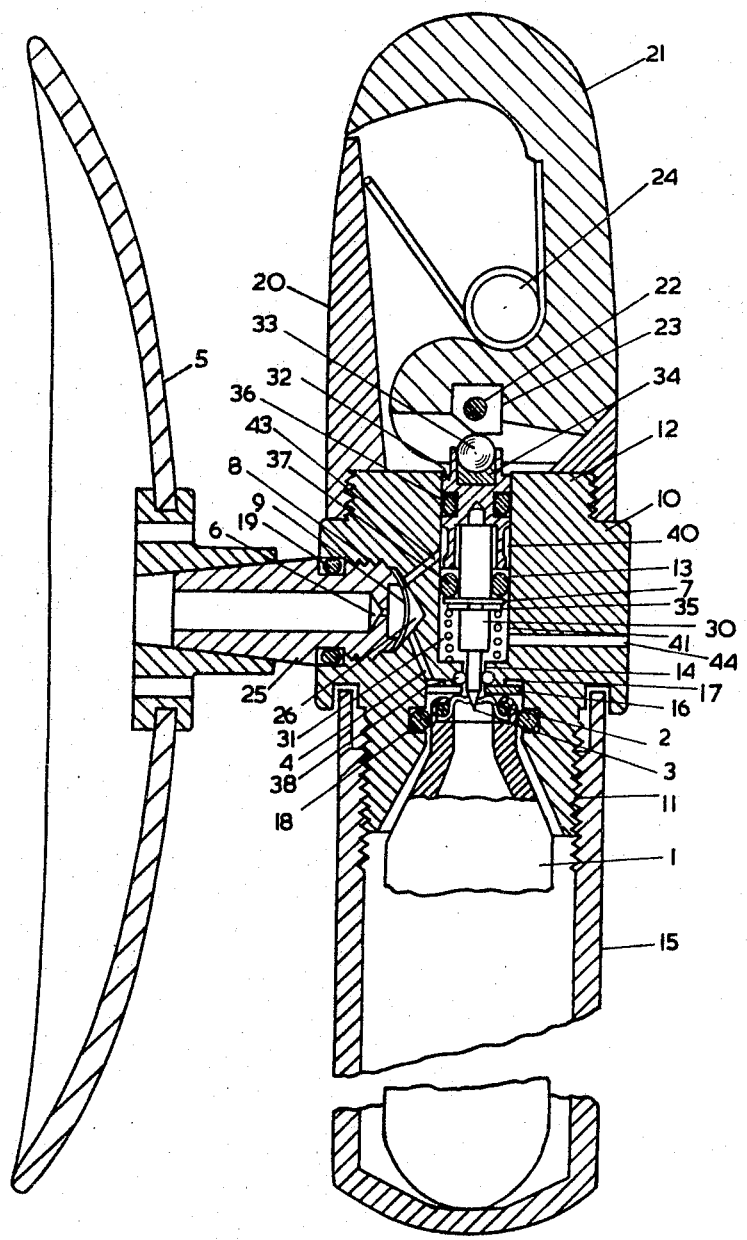
INVENTOR
CHRISTOPHER ALAN HOGG
BY Townsend & Measrole
ATTORNEY United States Patent Office 3,326,231
Patented June 20, 1967

3,326,231
FLUID REGULATING VALVE MECHANISM
Christopher Alan Hogg, Ilford, England, assignor to The British Oxygen Company Limited, a British company
Filed Nov. 19, 1964, Ser. No. 412,358
Claims priority, application Great Britain, Nov. 21, 1963, 46,016/63
4 Claims. (Cl. 137—318)

The present invention relates to a fluid regulating valve mechanism intended to regulate the flow rate of pressure fluid from a puncturable storage container, and is particularly intended for use where a controlled pressure is required. Various applications of such a mechanism are possible, including for example devices where the pressure fluid is arranged to produce a mechanical effect such as the operation of a toy or model, the production of a spray, or the ejection of a cork from a bottle, and devices where the pressure fluid is to be released at a desired flow rate, into respiratory apparatus for example. A simple form of respiratory apparatus comprises essentially a face mask, a holder for a puncturable compressed gas container e.g. for oxygen, and a pointed member under the control of a valve mechanism, said pointed member serving both to puncture the container and to act as a needle valve to control the flow of gas from the container into the face mask. The present invention provides a valve mechanism which controls the pointed member in such a way that the needle valve provides a substantially constant flow rate over a wide range of compressed gas pressures.

According to the present invention, in a valve mechanism for dispensing pressure fluid from a puncturable storage container, a pointed member serves both to puncture the container and to control the flow of fluid therefrom in the manner of a needle valve, and the position of the pointed member while acting as a needle valve is controlled by valve operating means which is responsive to the pressure of the fluid on the outlet side of the valve so as to reduce the valve opening on an increase in said pressure.

The valve operating means may conveniently comprise a valve operating members having the pointed member attached to one end and with its other end exposed to the pressure of the fluid on the outlet side of said valve so as to be urged by said pressure in a direction to close the valve. In this case the force due to this pressure may be resisted by a spring acting in opposition to the pressure, and the valve operating member is balanced, while fluid is being dispensed, between the pressure on said other end and the pressure and spring resistance on said one end. Hand operated means may be provided for over-riding this balance of forces, urging the valve operating member in a direction to close the valve.

A particular embodiment of the invention will now be described with reference to the accompanying drawing, which shows a longitudinal cross-section of a portable respirator incorporating a valve mechanism according to the invention. Gas for respiration is stored under pressure in a puncturable container 1, the cap 2 of which is pierceable by a hard pointed pin 3 which also acts in a manner to be described as a needle valve for dispensing the gas, which subsequently passes through the passage 4 and into the face mask 5 by way of a constricted outlet 6. The mask 5 is adapted to be pressed over a user's mouth and nostrils, and the whole apparatus is compact and readily portable.

The respirator has a main body member 10 in the form of a short cylinder, having screwed plugs 11 and 12 at opposite ends, and an axial cylindrical bore 13 which at its lower end is terminated by a reduced bore 14. The plug 11 has an external screw thread on to which may be screwed a holder 15 with a corresponding internal thread. The holder 15 is adapted to fit over the puncturable container 1, and if the pin 3 is held in its extended position it will pierce the cap 2 of the container as this is screwed into place. When in place the container 1 is located against a washer 16 which has a radial slot providing a passage to the annular groove 17 by which the gas released from the cap 2 passes into the passage 4. Escape of gas from the valve formed by the interaction of pin 3 and the cap 2, other wise than through the passage 4, is prevented by an O-ring 18, surrounding the top portion of the container 1.

On the plug 12 at the other end of the main body member 10 is permanently screwed an extension 20, on which is pivoted a finger operated actuator 21 rotatable about a pivot 22. Attached to the actuator is a cam 23, which co-acts with the valve mechanism to be described so that gas is dispensed into the face mask 5 when the actuator 21 is pressed down from the position shown against the force of its associated spring 24. The combined body member 10, holder 15, extension 20 and actuator 21 form a shape which is streamlined and convenient for holding in the hand, with the actuator readily operable by the user's thumb.

A socket 8 in the side wall of the body member 10 which communicates with the passage 4, accommodates a screwed nipple 25 which incorporates the restricted outlet 6 and also serves to locate the face mask 5. Escape of gas past the screwed nipple 25 is prevented by an O-ring 19. The base of the socket contains a wire mesh filter 9 and forms a hollow chamber 26 into which the bore 4 is drilled.

Within the bore 13 of the body member 10 is accommodated the valve operating mechanism, which on depression of the actuator 21 regulates the flow of gas from the container 1 into the face mask by controlling the opening of the needle valve formed by the pin 3 in accordance with the flow rate.

The pin 3 is mounted on a valve operating member 30 which has a large diameter portion slidable within the bore 13 and a small diameter portion slidable within the bore 14. To the large diameter portion of the valve operating member 30 is affixed a circlip 35 which retains a washer 7 and the valve operating member is urged in the direction to open the valve by a spring 31.

An element 32 surrounds the upper portion of the valve operating member 30 in abutting engagement therewith and is also slidable within bore 13. Motion of the element 32 is effected by a cam 23 acting on a hardened steel ball 33 which in turn acts on a resilient plug 34 of hard synthetic rubber retained in a counterbored recess in the element 32, and the motion is limited by the compression of plug 34. The spring 31 maintains the valve operating member 30 in contact with the element 32 and this in turn is maintained in contact through the plug 34 with the steel ball 33 and the cam 23.

A sealing ring 36 surrounds the element 32, and a similar ring 37 rests on the flange formed by washer 7 mounted on the large diameter portion of valve operating member 30. These sealing rings combine to enclose a chamber 40 lying between these two members. A further sealing ring 38 surrounds the pin 3 where it passes through the bore 14, preventing the ingress of pressure gas into a chamber 41 under the washer 7.

The flow regulation of the valve depends on two communicating passages drilled in member 10 in adidtion to the aforesaid passage 4; namely a passage 43 connecting the chamber 26 at the base of the nipple 25 to the chamber 40, and a passage 44 which maintains the chamber 41 at ambient pressure.

To use the device, a full container 1 of compressed gas is placed in the holder 15, which is screwed on to the plug 11 with the actuator 21 in the inoperative position shown. In this position the cam 23 prevents movement of the ball 33, and the valve operating member 30 is limited in its upward movement by the amount to which the plug 34 can be compressed. Consequently the pin 3 is held extended sufficiently to puncture the cap 2 of the container as the holder 15 is screwed on; thereafter the resilience of the plug 34 holds the pin 3 against the cap 2 and prevents leakage.

On a user depressing the actuator 21 against the force of its associated spring, the cam 23 is rotated and a relieved portion of this allows the element 32 and the valve operating member 30 to rise under the force of the spring 31. As the pin 3 is withdrawn from the cap 2, gas is released from the container and passes down the passage 4, thence out of the constricted outlet 6 of the nipple 25. Due to the constriction 6 the pressure in the chamber 26 at the inlet end is higher than ambient, and corresponds to the flow rate through the constriction. This pressure is communicated to chamber 40 via the passage 43. Provided that the actuator is depressed sufficiently so that the force acting on the plug 34 via steel ball 33 is less than the force imposed by the spring 31, the position of the valve operating member 30 depends upon the balance between the outlet pressure in chamber 40 acting upon the upper end (mainly upon the upper surface of the sealing ring 37), and the pressure on the other end of the member 30 (comprising the outlet pressure acting upon the relatively smaller area of the pointed end of the pin 3, plus the ambient pressure acting through the passage 44) together with the spring resistance.

This balance can be over-ridden by the user releasing the actuator 21, so that the cam 23 is rotated and the element 32 and valve operating member 30 are urged downwards to close the valve.

Provided that the movement is relatively small, the pressure and spring resistance or force on the lower end of the valve operating member 30 are relatively constant, and therefore provide for a relatively constant pressure in chamber 40 and consequently a relatively constant flow rate from the nipple 25.

I claim:
1. In a valve mechanism for dispensing pressure fluid from a puncturable storage container, a pointed member operable both the puncture the container and to control the flow of fluid therefrom in the manner of a needle valve, and valve operating means operable to control the position of the pointed member while said member is acting as a needle valve, said means being responsive to the pressure of the fluid on the outlet side of the valve whereby to reduce the valve opening on an increase in said pressure.

2. A valve mechanism according to claim 1 in which said valve operating means comprises a valve operating member having first and second ends, said first end having said pointed member attached thereto, said second end being exposed to said pressure of the fluid on the outlet side and said valve operating member being urged by said pressure in a direction to close said valve.

3. A valve mechanism according to claim 2, including a spring operable to resist the urging of said valve operating member in a direction to close said valve, said valve operating member being balanced, while fluid is being dispensed, between said pressure of the fluid on said second end and the pressure on said first end plus the spring resistance.

4. A valve mechanism according to claim 3, including hand operated means operable to over-ride said balance and urge said valve operating member in a direction to close said valve.

References Cited

UNITED STATES PATENTS

| | | | |
|---|---|---|---|
| 2,608,989 | 9/1952 | McDonald | 137—318 |
| 2,842,293 | 7/1958 | Knapp et al. | 222—5 X |
| 3,150,799 | 9/1964 | Flynn | 222—52 |
| 3,197,144 | 7/1965 | Kochner | 137—505.25 |

WILLIAM F. O'DEA, *Primary Examiner.*

R. GERARD, *Assistant Examiner.*